United States Patent
Ma

(10) Patent No.: US 12,455,789 B2
(45) Date of Patent: Oct. 28, 2025

(54) SOFTWARE VERSION ROLLBACK METHOD, APPARATUS, AND SYSTEM

(71) Applicant: SHENZHEN YINWANG INTELLIGENT TECHNOLOGIES CO., LTD., Shenzhen (CN)

(72) Inventor: Tao Ma, Beijing (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 86 days.

(21) Appl. No.: 17/896,677

(22) Filed: Aug. 26, 2022

(65) Prior Publication Data
US 2023/0004381 A1  Jan. 5, 2023

Related U.S. Application Data

(63) Continuation of application No. PCT/CN2020/077294, filed on Feb. 28, 2020.

(51) Int. Cl.
  *G06F 11/14* (2006.01)
  *G06F 8/658* (2018.01)
  *G06F 8/71* (2018.01)

(52) U.S. Cl.
  CPC .......... *G06F 11/1433* (2013.01); *G06F 8/658* (2018.02); *G06F 8/71* (2013.01)

(58) Field of Classification Search
  CPC ......... G06F 8/658; G06F 8/71; G06F 11/1433
  See application file for complete search history.

(56) References Cited

U.S. PATENT DOCUMENTS

| | | | |
|---|---|---|---|
| 7,107,486 B2 * | 9/2006 | Okada | G06F 11/1469 714/E11.122 |
| 7,664,984 B2 * | 2/2010 | Wang | G06F 11/1417 714/15 |

(Continued)

FOREIGN PATENT DOCUMENTS

| | | |
|---|---|---|
| CN | 1726476 A | 1/2006 |
| CN | 101420431 A | 4/2009 |

(Continued)

OTHER PUBLICATIONS

Office Action in Chinese Appln. No. 202080002270.X, dated Mar. 2, 2022, 14 pages (with English translation).

(Continued)

*Primary Examiner* — Douglas M Slachta
(74) *Attorney, Agent, or Firm* — Fish & Richardson P.C.

(57) ABSTRACT

Example software version rollback methods, apparatuses, and systems are provided. One example method includes obtaining a differential update package of target software, where the differential update package includes a differential operation instruction, and the differential operation instruction is used to indicate a difference between a first version of the target software and a second version to which the target software is to be updated. A current version of the target software is updated by using the differential update package, where the current version of the target software is updated from a first version to a second version. When a rollback requirement for the target software is detected, the current version of the target software is rolled back to the first version.

20 Claims, 8 Drawing Sheets

(56) References Cited

U.S. PATENT DOCUMENTS

| | | | | |
|---|---|---|---|---|
| 8,645,946 | B2* | 2/2014 | Wookey | G06F 8/658 |
| | | | | 717/169 |
| 9,075,693 | B2* | 7/2015 | Sporkert | G06F 8/658 |
| 10,394,548 | B2* | 8/2019 | Fox | G06F 8/71 |
| 10,936,304 | B2* | 3/2021 | Fox | G06F 12/0646 |
| 11,907,698 | B2* | 2/2024 | Harata | H04W 4/14 |
| 2006/0004756 | A1 | 1/2006 | Peleg et al. | |
| 2006/0130046 | A1* | 6/2006 | O'Neill | G06F 9/3004 |
| | | | | 717/168 |
| 2013/0067449 | A1* | 3/2013 | Sannidhanam | G06F 8/60 |
| | | | | 717/170 |
| 2014/0297516 | A1* | 10/2014 | Brown | G06Q 20/00 |
| | | | | 715/753 |
| 2014/0344267 | A1* | 11/2014 | LeBert | G06F 16/972 |
| | | | | 707/736 |
| 2014/0372799 | A1* | 12/2014 | Wei | G06F 8/658 |
| | | | | 714/19 |
| 2015/0160940 | A1* | 6/2015 | Hufnagel | G06F 8/65 |
| | | | | 717/168 |
| 2016/0026452 | A1* | 1/2016 | Dani | G06F 8/71 |
| | | | | 717/170 |
| 2016/0291940 | A1* | 10/2016 | Searle | H04L 67/303 |
| 2016/0371076 | A1* | 12/2016 | Moeller | G06F 8/654 |
| 2017/0046152 | A1* | 2/2017 | Shih | G06F 11/0727 |
| 2017/0195459 | A1* | 7/2017 | e Costa | H04L 67/025 |
| 2017/0242678 | A1* | 8/2017 | Sangameswaran | G06F 8/656 |
| 2017/0262277 | A1* | 9/2017 | Endo | G06F 8/658 |
| 2018/0018160 | A1* | 1/2018 | Teraoka | G06F 9/445 |
| 2018/0095745 | A1* | 4/2018 | Mine | G06F 11/3698 |
| 2018/0246711 | A1* | 8/2018 | Kurosawa | B60K 35/00 |
| 2018/0276087 | A1 | 9/2018 | Elron et al. | |
| 2019/0034191 | A1* | 1/2019 | Fox | G06F 9/4401 |
| 2019/0265965 | A1* | 8/2019 | Acharya | H04L 12/40 |
| 2020/0050378 | A1* | 2/2020 | Sakurai | G06F 3/0679 |
| 2020/0081697 | A1* | 3/2020 | Sillankorva | G06F 8/658 |
| 2020/0159433 | A1* | 5/2020 | Miyamura | G06F 3/0643 |
| 2020/0183676 | A1* | 6/2020 | Sakurai | H04L 67/34 |
| 2021/0173635 | A1* | 6/2021 | Shin | H04L 67/34 |
| 2023/0004381 | A1* | 1/2023 | Ma | G06F 11/1433 |
| 2023/0120785 | A1* | 4/2023 | Kaimal | H04L 43/50 |
| | | | | 718/1 |

FOREIGN PATENT DOCUMENTS

| | | |
|---|---|---|
| CN | 101782934 A | 7/2010 |
| CN | 102609328 A | 7/2012 |
| CN | 105897863 A | 8/2016 |
| CN | 106293793 A | 1/2017 |
| CN | 106325892 A | 1/2017 |
| CN | 109804355 A | 5/2019 |
| CN | 110019050 A | 7/2019 |
| CN | 110321254 A | 10/2019 |
| CN | 110502317 A | 11/2019 |
| JP | 2008501180 A | 1/2008 |
| JP | 2020028121 A | 2/2020 |
| WO | 2016202000 A1 | 12/2016 |
| WO | 2019229091 A1 | 12/2019 |

OTHER PUBLICATIONS

Office Action in Chinese Appln. No. 202080002270.X, dated Sep. 14, 2022, 10 pages (with English translation).

Office Action in Chinese Appln. No. 202080002270.X, dated Feb. 11, 2023, 6 pages.

Extended European Search Report in European Appln No. 20920851.1, dated Jan. 17, 2023, 11 pages.

International Search Report and Written Opinion in International Appln. No. PCT/CN2020/077294, mailed on Nov. 26, 2020, 19 pages (with English translation).

Office Action in Japanese Appln. No. 2022-551726, mailed on Sep. 19, 2023, 7 pages (with English translation).

* cited by examiner

SOFTWARE VERSION ROLLBACK METHOD, APPARATUS, AND SYSTEM

CROSS-REFERENCE TO RELATED APPLICATIONS

This application is a continuation of International Application No. PCT/CN2020/077294, filed on Feb. 28, 2020, the disclosure of which is hereby incorporated by reference in its entirety.

TECHNICAL FIELD

This application relates to the field of computer technologies, and in particular, to a software version rollback method, apparatus, and system.

BACKGROUND

With development of intelligent connected vehicles, more vehicles have a network access function, and a new vehicle software update manner, that is, over the air (over the air, OTA) emerges. OTA implements updating vehicle software by using an air communications interface, for example, Wi-Fi, long term evolution (long term evolution, LTE), and a satellite. A vehicle obtains software of a new version through OTA for system update.

During installation of the software of the new version, installation failure or abnormal running of the software of the new version may occur. This results in unavailability of software-related functions, and some functions of the vehicle further become unavailable after the update. In this case, the software needs to be rolled back to the old version used before the update in a timely manner to ensure normal and secure running of vehicle functions.

Currently, before software of a new version is installed, the vehicle backs up a software package of an old version for rollback. When an update exception occurs, the software of the old version is reinstalled on the vehicle to implement rollback. Because storage space in the vehicle is limited, and the software of the old version backed up occupies large storage space, storage space of the vehicle needs to be increased to meet a storage requirement, which increases storage costs of the vehicle.

SUMMARY

This application provides a software version rollback method, apparatus, and system, so that a driving system can be rolled back and run based on software of an old version while occupancy of storage space of a vehicle is reduced, to ensure running security (security) of a terminal.

According to a first aspect, an embodiment of this application provides a software version rollback method. The method may be implemented by a terminal device (for example, a vehicle), or may be implemented by a component of a terminal device, for example, implemented by a component such as a processing apparatus, a circuit, or a chip in the terminal device. The method includes: A terminal device obtains a differential update package of target software, and updates a current version of the target software by using the differential update package, where the current version of the target software is updated from a first version to a second version; and when detecting that there is a rollback requirement for the target software, the terminal device performs rollback on the target software by using the differential update package, to roll back the current version of the target software to the first version.

The differential update package includes at least one differential operation instruction, and the differential operation instruction is used to indicate a difference between the current first version of the target software and the second version to which the target software is to be updated.

In the foregoing method, when the terminal device implements software version rollback on the target software, a complete installation file of target software of an old version does not need to be re-downloaded from an update server, and the complete installation file of the target software of the old version does not need to be backed up. The terminal device may directly use the differential update package used for updating the target software to roll back the target software, so as to roll back to the old version for running. In this way, timely software rollback can be implemented while occupancy of storage space of a vehicle is reduced.

In a possible design, the differential update package includes at least one differential operation instruction, the differential operation instruction includes an instruction type and differential data, and the differential data includes a first address space and/or first data stored in the first address space in the first version, and second data and/or a second address space in the second version.

In a possible design, the method further includes: generating a differential rollback package based on the differential update package. The differential rollback package is obtained in the following manner. First, the at least one differential operation instruction arranged in the differential update package is rearranged according to a preset sequence. For example, when differential operation instructions in the differential update package are arranged according to an execution sequence in chronological order, the preset sequence may be a sequence in reverse chronological order. For another example, the differential operation instructions in the differential update package are arranged according to the execution sequence in reverse chronological order, and the preset sequence may be a sequence in chronological order. Then the differential rollback package is obtained by replacing each rearranged differential operation instruction with a reverse differential operation instruction corresponding to the differential operation instruction. The reverse differential operation instruction corresponding to the differential operation instruction indicates performing a second differential operation according to the reverse differential operation instruction after a first differential operation is performed according to the differential operation instruction, to roll back a version of the target software to a state existing before the first differential operation is performed. The performing rollback on the target software by using the differential update package includes: rolling back the target software by using the differential rollback package.

In the foregoing method, when rolling back the software version of the target software, the terminal device may generate the differential rollback package by using the differential update package of the target software, and may roll back the target software in time by using the differential rollback package, to roll back the target software to the old version for running. This can shorten time spent on rollback and reduce storage space used for software update and software rollback. In addition, in this embodiment of this application, the manner of generating the differential rollback package based on the differential update package is simple and efficient, and computing overheads are low.

In a possible design, the instruction type includes but is not limited to ignoring, shift, insertion, deletion, or replacement.

For example, when the instruction type of the differential operation instruction is shift, the differential operation instruction is used to instruct to shift the first data from the first address space to the second address space. The second address space is an address space other than the first address space in a first system. The reverse differential operation instruction corresponding to the differential operation instruction is to shift the first data in the second address space back to the first address space.

For another example, when the instruction type of the differential operation instruction is insertion, the differential operation instruction is used to instruct to add the second address space in the first system, and add the second data included in the differential operation instruction to the second address space. The reverse differential operation instruction corresponding to the differential operation instruction is to delete the second address space.

For another example, when the instruction type of the differential operation instruction is deletion, the differential operation instruction is used to instruct to delete the first address space and the first data stored in the first address space. The reverse differential operation instruction corresponding to the differential operation instruction is to add the first address space and add the first data to the first address space.

For another example, when the instruction type of the differential operation instruction is replacement, the differential operation instruction is used to instruct to replace the first data in the first address space with the second data. The reverse differential operation instruction corresponding to the differential operation instruction is to replace the second data in the first address space with the first data.

According to a second aspect, an embodiment of this application provides a software version rollback method. The method may be implemented by an update server, or may be implemented by a component of a software update server, for example, implemented by a component such as a processing chip or a circuit in the software update server. The method includes: receiving a download instruction from a software version rollback apparatus, where for example, the download instruction includes information of target software, for example, a name of the target software and a version number of a version to which the target software is to be updated; and sending a differential update package to the software version rollback apparatus.

In a possible design, the update server generates a differential rollback package by using the differential update package; and sends the differential rollback package to the software version rollback apparatus.

According to a third aspect, an embodiment of this application provides a communications apparatus. The apparatus has a function of implementing the method in the first aspect. The function may be implemented by hardware, or may be implemented by software, or may be implemented by hardware that executes corresponding software. The apparatus includes one or more modules corresponding to the foregoing function, for example, includes a transceiver unit and a processing unit.

In a possible design, the apparatus may be a chip or an integrated circuit.

In a possible design, the apparatus includes a memory, a processor, and a transceiver. The transceiver is configured to receive and send data. The memory is configured to store a program or instructions executed by the processor. When the program is executed or the instructions are executed by the processor, the apparatus may perform the method in the first aspect and various possible designs of the first aspect.

In a possible design, the apparatus may be a terminal device.

According to a fourth aspect, an embodiment of this application provides an update server. The apparatus has a function of implementing the method in the first aspect. The function may be implemented by hardware, or may be implemented by software, or may be implemented by hardware that executes corresponding software. The apparatus includes one or more modules corresponding to the foregoing function, for example, includes a transceiver unit and a processing unit.

In a possible design, the apparatus may be a chip or an integrated circuit.

In a possible design, the apparatus includes a memory, a processor, and a transceiver. The transceiver is configured to receive and send data. The memory is configured to store a program or instructions executed by the processor. When the program is executed or the instructions are executed by the processor, the apparatus may perform the method in the first aspect and various possible designs of the first aspect.

In a possible design, the apparatus may be an OTA server.

According to a fifth aspect, an embodiment of this application provides an apparatus. The apparatus includes a processor, a memory, and a communications interface. The communications interface is configured to receive or send a signal. The memory is configured to store a program or instruction code. The processor is configured to invoke the program or the instruction code from the memory to perform the method in the first aspect or perform the method in the second aspect and the possible designs of the second aspect.

According to a sixth aspect, an embodiment of this application provides an apparatus. The communications apparatus includes a processor and an interface circuit, and the interface circuit is configured to: receive a program or instruction code and transmit the program or the instruction code to a processor. The processor runs the program or the instruction code to perform the method in the first aspect and the possible designs of the first aspect, or the method in the second aspect and the possible designs of the second aspect.

According to a seventh aspect, an embodiment of this application provides a computer-readable storage medium. The computer-readable storage medium is configured to store a program or instructions. When the program is executed or the instructions are executed, the method in the first aspect and the possible designs of the first aspect, or the method in the second aspect and the possible designs of the second aspect is implemented.

According to an eighth aspect, an embodiment of this application provides a computer program product including instructions. When the instructions are executed, the method in the first aspect and the possible designs of the first aspect, or the method in the second aspect and the possible designs of the second aspect is implemented.

According to a ninth aspect, an embodiment of this application further provides a software version rollback system, including an update server and a software version rollback apparatus. The software version rollback apparatus may perform a corresponding function in any one of the first aspect or the possible implementations of the first aspect, and the update server may perform a corresponding function in any one of the second aspect or the possible implementations of the second aspect. For details, refer to detailed description in method examples. The details are not described herein again.

DESCRIPTION OF EMBODIMENTS

To make objectives, technical solutions, and advantages of this application clearer, the following further describes this application in detail with reference to accompanying drawings. A specific operation method in a method embodiment may also be applied to a device embodiment or a system embodiment.

As the automobile industry is in continuous development, more software is installed on vehicles. Specifically, the software installed on the automobiles is usually installed on an electronic control unit (electronic control unit, ECU). For example, an anti-lock brake system, an automatic transmission system, a multimedia system, an auxiliary brake system, a cruise control system, an air conditioning system, an actuation system, a suspension system, a safety system, and the like in a vehicle all include ECUs. Various complex control logic and computing functions in each system may be run on the ECUs in the systems in a form of software, so that the vehicle can properly operate.

It should be noted that some or all systems included in a vehicle may be integrated into a same ECU, or may be separately deployed on different ECUs. This is not limited in embodiments of this application.

It should be understood that the method and the apparatus provided in embodiments of this application may be applied to vehicles such as a smart car (smart/intelligent car), a digital car (digital car), an unmanned car/driverless car (unmanned car/driverless car), or a self-driving car (self-driving car).

Currently, there are two manners of updating vehicle software. One manner is to update vehicle software in a wired manner by using a dedicated device. The other manner is OTA (over the air, over the air) update. OTA update refers to update or update vehicle software through interaction with a cloud via a wireless communications interface such as Wi-Fi, LTE, or a satellite. When OTA update is adopted, the vehicle software can be updated anytime and anywhere, which is more flexible and convenient.

It should be understood that the vehicle software may include but is not limited to one or more of the following: software related to advanced driver assistance system (advanced driver assistance system, ADAS), software related to infotainment (infotainment, IVI), software related to telematics (telematics), software related to information security (information security), software related to on-board diagnostic (on-board diagnostic, OBD), an operating system (operating system, OS), map (map) software, and the like.

Figure 1:
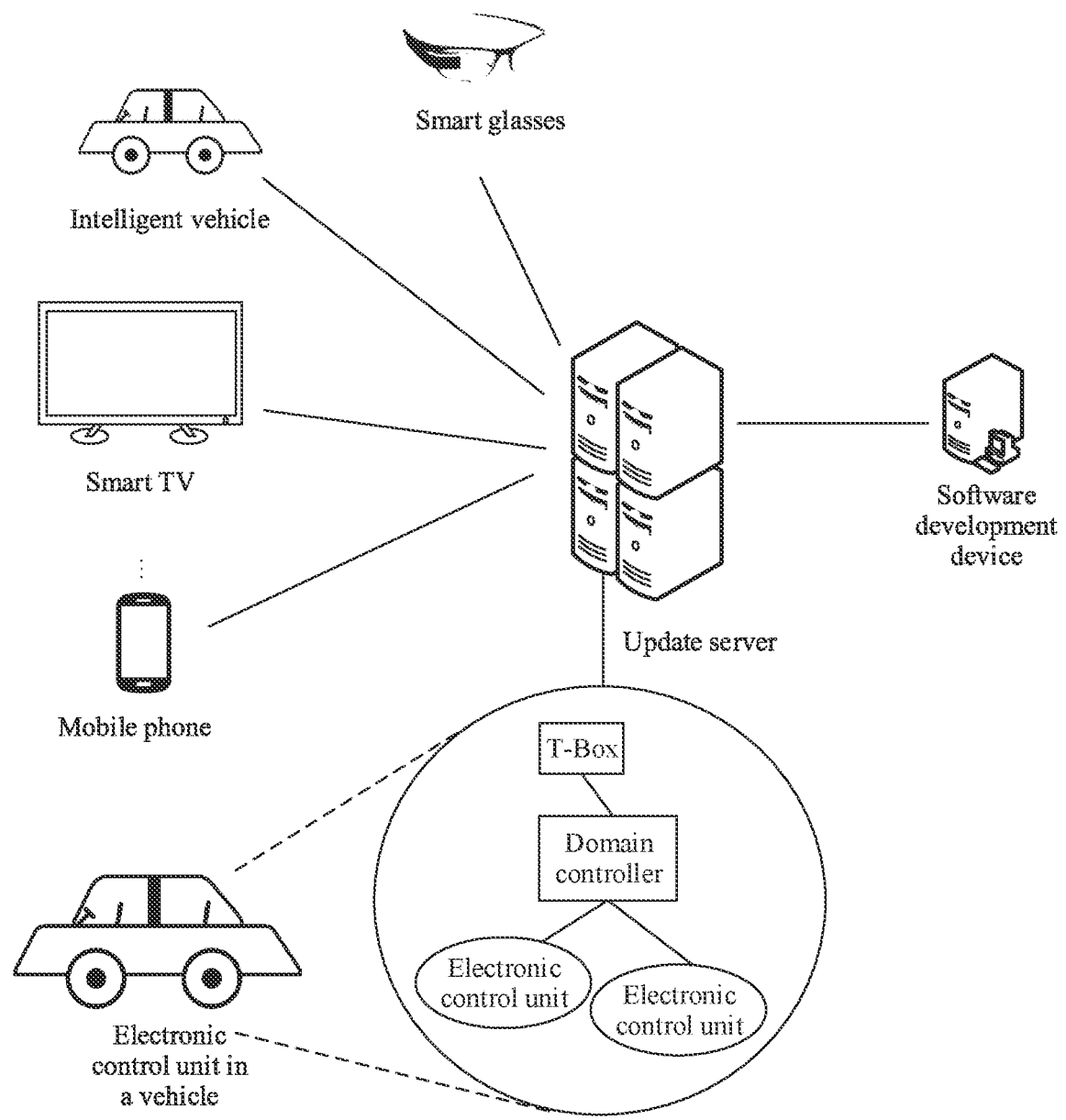
FIG. 1 is a schematic diagram of a system architecture according to this application.

FIG. 1 is a schematic diagram of a system architecture according to an embodiment of this application. Refer to FIG. 1. The system includes a terminal device, an update server, a software development device, and the like.

Some terms in this application are described below, so that a person skilled in the art has a better understanding.

(1) A software development device may be a device used by a software designer to develop application software of an application and a software update package of the application software. As described above, the software update package may be a complete installation file of a new version of the application software, or may be a differential update package of the application software. Optionally, the software development device may be further configured to generate a differential rollback package of the application software based on the software update package of the application software, where the differential rollback package is used to roll back updated application software, so that the new version of the application software is rolled back to an old version.

To be specific, the software update package and the differential rollback package in this embodiment of this application may further carry version numbers used to indicate versions of the application software. A terminal device may download, based on the version numbers, the corresponding software update package or differential rollback package. For example, the version number may be a character or a character string having a special meaning, for example, a current version number of the application software is v.2.0, and a version number of application software of the new version is v.2.1.

Optionally, the software development device may belong to an application vendor or a vendor of a terminal device on which the application software can be installed. This is not limited in this application. For example, the software development device may be a computer, a server, or the like.

(2) An update server may be a third-party device that can store a software update package and a differential rollback package of application software and provide a file (including the software update package and the differential rollback package) download service for a terminal device. Optionally, the update server may be an OTA server or the like.

The update server may establish a connection with a software development device, to obtain a software update package of a new version and a differential rollback package of application software newly developed by the software development device, and store the software update package and the differential rollback package. It should be noted that the foregoing case is provided merely for ease of description. The update server may not simultaneously obtain the software update package and the differential rollback package. For example, the update server obtains only the software update package. This is not limited in this application. In addition, the update server may further establish a connection with the terminal device, to obtain a requirement of the terminal device for updating the application software; select, based on the update requirement, a software update package of the application software with a corresponding version number; and send the selected software update package to the terminal device, so that the terminal device may update the application software.

Optionally, the software development device and the update server may be integrated into a same device, that is, the device has functions of both the software development device and the update server.

(3) An application can provide a corresponding service function for a user. To be specific, a terminal device on which application software of an application is installed may run the application, to implement a service function of the application.

For example, for map navigation software having a GPS positioning function and map information, the map navigation software may be installed on and run by a terminal device, to provide a service function of positioning and navigation for a user. For ease of description, application software is referred to as software for short in the following description.

Due to a half-baked design of a software designer or an incomplete application function, or due to increasing service requirements of a user for an application, the software designer usually further needs to develop a software update package for updating software after the software is released, so as to fix a vulnerability of the software or extend an application function.

It should be noted that software in embodiments of this application may alternatively be an operating system of the terminal device, for example, an Android system.

(4) A terminal device may be a device that provides a user with various corresponding service functions such as a voice function, a video function, a photographing function, and data connectivity when software is installed on and run by the terminal device. In this embodiment of this application, the terminal device may update the software by using software update package downloaded from an update server, to obtain a new version based on an old version that is currently run; or roll back the software by using a differential rollback package, to roll back from the new version to the old version.

In different application scenarios, forms of the terminal device are different, as shown in FIG. 1. For example, in a conventional mobile communications scenario, the terminal device may be a mobile phone, a tablet computer, or the like. In an internet of things (internet of things, IoT) communications scenario, the terminal device may be a mobile internet device, a wearable device, or various wireless terminals in industry or smart household. In an Internet of Vehicles or vehicle to everything (vehicle to everything, V2X) communications scenario, the terminal device may be a vehicle, or may be an on board unit (on board unit, OBU), a road side unit (road side unit, RSU), road side equipment (road side equipment, RSE), an electronic control unit (electronic control unit, ECU), or the like in the Internet of Vehicles.

It should be noted that, in the system provided in this application, the terminal device may establish a communication connection with the update server through a mobile communications network (including an access network and a core network), to perform communication interaction. For example, after the terminal device establishes the connection with the update server, the terminal device may download a software update package and/or a differential rollback package from the update server. The terminal device may alternatively establish the communication connection with the update server through the mobile communications network by using at least one relay device to perform communication interaction. For example, when the terminal device is the electronic control unit in the V2X communications scenario, as shown in FIG. 1, the electronic control unit may be connected to the update server through the following relay devices in sequence: a domain controller (domain controller, DC) and a T-Box.

The update server may establish a communication connection to the software development device through a conventional internet protocol (internet protocol, IP) network, to perform communication interaction.

In addition, the architecture shown in FIG. 1 may be applied to a plurality of communications scenarios, for example, the 5th generation (the 5th generation, 5G) communications system, a future 6th generation communications system and another evolved communications system, the 4th generation (the 4th generation) communications system, vehicle to everything (vehicle to everything, V2X), long term evolution-vehicle (LTE-vehicle, LTE-V), vehicle to vehicle (vehicle to vehicle, V2V), Internet of Vehicles, machine type communications (machine type communications, MTC), internet of things (internet of things, IoT), long term evolution-machine to machine (LTE-machine to machine, LTE-M), and machine to machine (machine to machine, M2M). This is not limited in this application.

Figure 2:
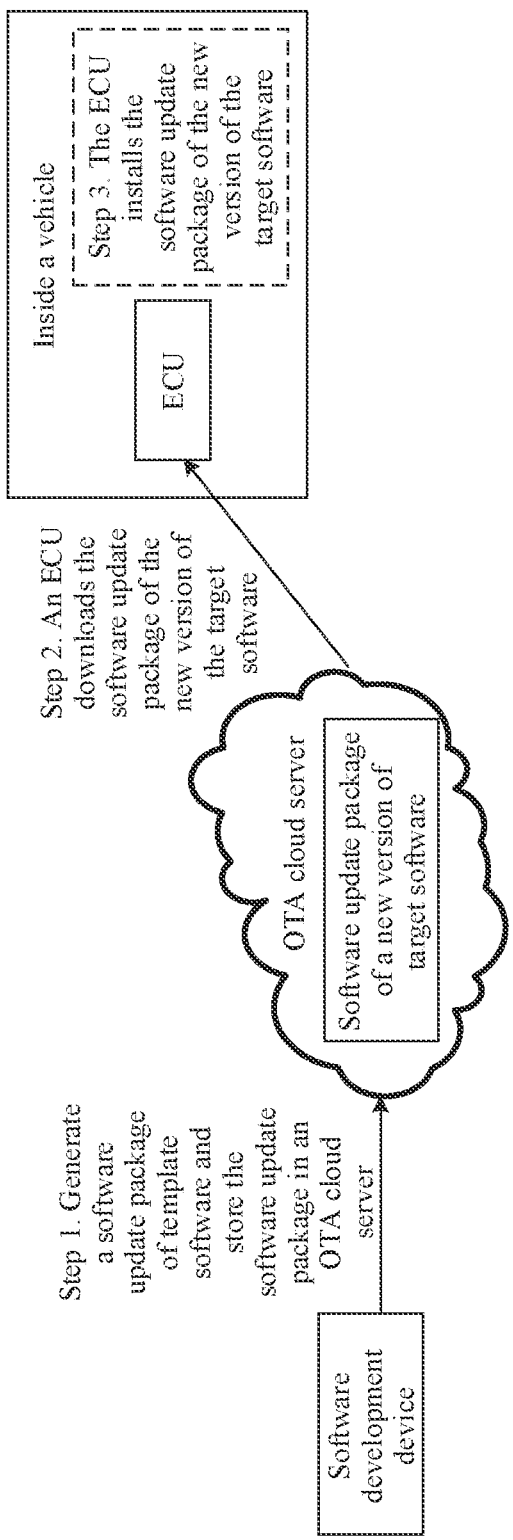
FIG. 2 is a schematic flowchart of software update according to this application.

The following describes an OTA update method for vehicle software. The method may be implemented by a terminal device, or may be implemented by a component of a terminal device, for example, an ECU. The ECU is used as an example herein to describe the OTA update method for vehicle software. The method may be applied to the system architecture shown in FIG. 1. Refer to FIG. 2. FIG. 2 is a schematic flowchart of an OTA update method for vehicle software. A procedure may include the following steps.

Step 1. Generate a software update package. To be specific, a software designer uses a software development device to develop and generate a software update package of a new version of target software, and sends the software update package of the new version to an OTA cloud server; and the OTA cloud server stores the software update package.

Step 2. An ECU in a vehicle downloads the software update package of the new version of the target software from the OTA cloud server. To be specific, after detecting that the OTA cloud server has the software update package of the new version of the target software, the ECU downloads the software update package from the OTA cloud server. The ECU that performs the download operation may be an ECU on which the target software is installed, or may be an ECU used as an update master node. It should be understood that the ECU used as the update master node may manage software update of another ECU on the vehicle, and the another ECU is a slave node of the ECU used as the update master node. The following describes in detail a relationship between the ECU used as the master node and the ECU used as the slave node.

Step 3. The ECU installs the software update package of the new version and updates the target software from a current version to the new version.

Based on different forms of software update packages, the OTA update manner may be further classified into full OTA and differential OTA. In full OTA, a software update package of a new version may include a complete installation file of the target software of the new version. In differential update, the software update package of the new version may be a differential update package of the target software of the new version relative to target software of a current version (or referred to as an old version) run on the ECU. The differential update package may include a difference between the target software of the new version and the target software of the old version. For example, the difference may be that a part of data is deleted or a part of data is added in the new version when the new version is compared with the old version. The ECU adjusts the target software of the old version based on the difference indicated by the differential update package, to obtain the target software of the new version.

The foregoing describes an update process of target software in a vehicle. After updating the target software, a new version is obtained based on an old version. However, in a possible scenario, there may further be a rollback requirement for the target software after update. For example, a user wants to use software of the old version. For another example, there may be a bug in software of the new version, causing abnormal running of the software of the new version. After detecting that there is a rollback requirement for the target software, the ECU may roll back the target software to obtain the target software of the old version. Currently, a common rollback manner is that the ECU re-downloads a complete installation file of the target software of the old version from an OTA cloud server, or the ECU backs up the complete installation file of the target software of the old version before updating the target software of the old version. When there is a rollback requirement for the target software, the ECU re-installs the complete installation file of the target software of the old version, so that a currently running version of the target software is rolled back to the old version, where the old version refers to a version in which the target software normally runs before being updated by using a software update package of the new version.

It should be understood that the rollback manner of re-downloading the complete installation file of the target software of the old version takes a long time, and may cause untimely rollback, which affects normal operation of the vehicle. In addition, storage space of the vehicle is usually limited, and large storage space is needed for implementing the rollback manner of backing up the complete installation file of the target software of the old version, which may cause a problem of insufficient storage space.

In view of this, this application provides a software rollback method. In embodiments of this application, after a terminal device updates target software by using a differential update package, if there is a rollback requirement for the target software, the target software may be rolled back by using the differential update package. If the terminal device is an ECU, that is, there is a rollback requirement for target software in the ECU, the ECU does not need to download a complete installation file of target software of an old version from an OTA cloud server, and does not need to back up the complete installation file of the target software of the old version. The ECU may directly roll back the target software by using the differential update package used for updating the target software, to roll back to the old version for running. In this way, timely software rollback is performed while storage space occupancy of a vehicle is reduced.

The following describes a technical solution of the software version rollback method provided in this application in detail.

Figure 3:
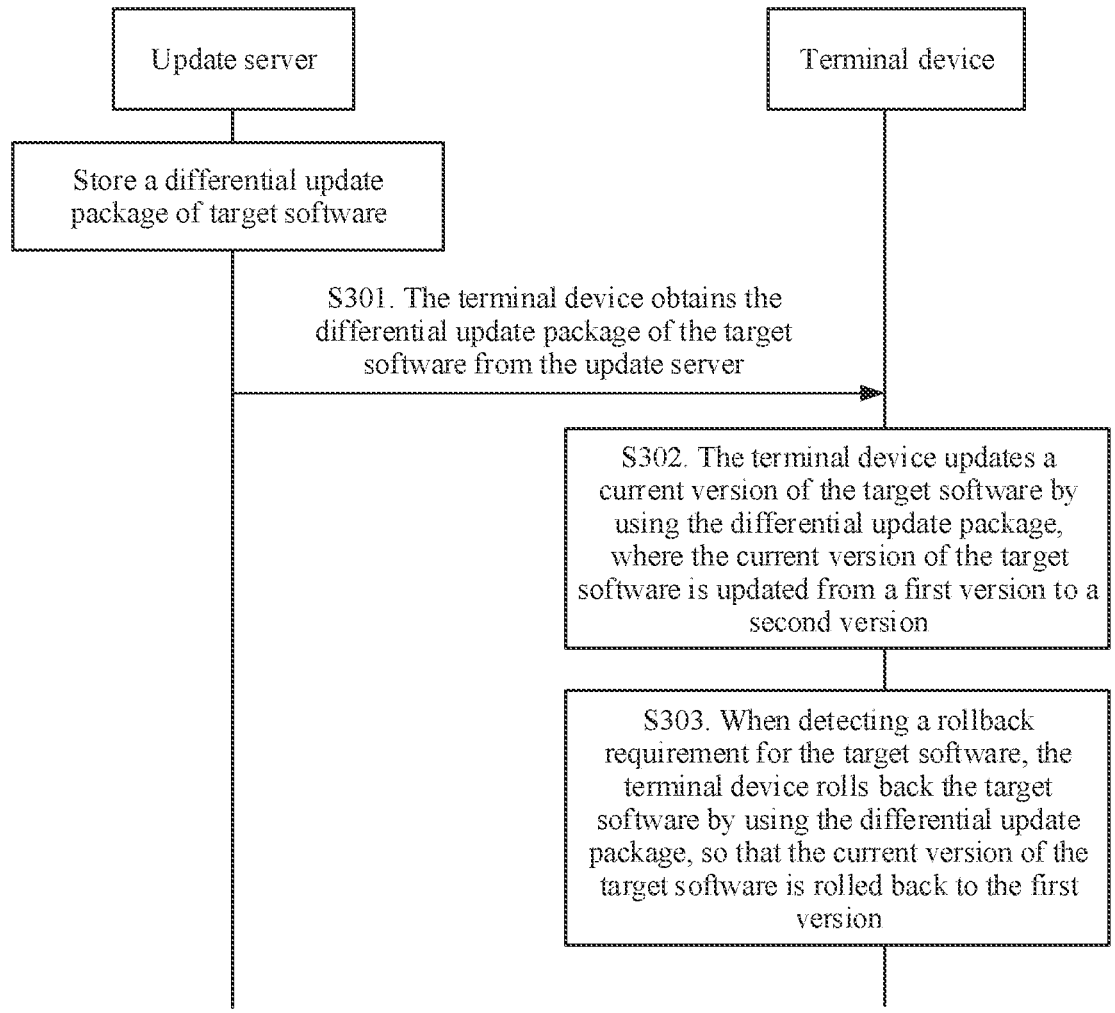
FIG. 3 is a schematic flowchart of a software rollback method according to an embodiment of this application.

Refer to FIG. 3. FIG. 3 is a schematic flowchart of a software version rollback method according to an embodiment of this application. The method is applicable to the system architecture shown in FIG. 1. The method includes the following steps.

S301. A terminal device downloads a differential update package of target software from an update server.

The differential update package includes at least one differential file, and the differential file records a difference between a current first version of the target software and a second version to which the target software is to be updated.

Optionally, the differential file may further include a file header, where the file header may be used to indicate the target software. Optionally, the file header may further include information such as a version number corresponding to the differential file.

It should be understood that before this step, a software developer develops the differential update package of the target software by using a software development device, and sends the differential update package to the update server for storage.

S302. The terminal device updates a current version of the target software by using the differential update package, to obtain the second version of the target software based on the first version of the target software.

S303. When detecting that there is a rollback requirement for the target software, the terminal device rolls back the target software by using the differential update package, so that the current second version of the target software is rolled back to the first version.

The following describes in detail the solution of the embodiment shown in FIG. 3 with reference to a specific embodiment.

The differential update package is first described in detail. For ease of understanding and differentiation, the first version of the target software is referred to as an old version, and the second version of the target software is referred to as a new version in the following description.

The differential update package in this embodiment of this application includes at least one differential file, and the at least one differential file records a difference between target software of the new version and target software of the old version.

The following describes the differential update package of the new version of the target software with reference to a specific embodiment.

It is assumed that in this embodiment of this application, the differential file in the differential update package of the new version of the target software are generated by using the software development device based on software code of the target software of the old version.

For example, the differential file includes at least one differential operation instruction, and each differential operation instruction may include an instruction type and differential data. The differential data may be understood as a data difference between the new version and the old version, and the instruction type may be understood as an indication of a specific instruction type difference corresponding to the data difference. Specifically, the differential data further includes address space information and data. For example, the instruction type is insertion, and the differential data includes a new address space and to-be-inserted data (that is, new data) aaa, that is, a location at which the new data is inserted is the new address space. In this case, the differential operation instruction is to insert the data aaa into the new address space of the old version.

The address space is an address range for data storage. The address space in this embodiment of this application may be represented in a plurality of forms. For example, the address space may be a code segment identifier or a code line identifier of the software code of the target software. A code segment is used to identify a segment of code. The code segment may include one line of code, or may include a plurality of lines of code. Each line of code includes a line number and code content. Each code segment has a code segment identifier, and each line of code has a code line identifier, for example, a line number. It should be noted that, if the code segment includes one line of code, the code segment identifier is a line number of the line of code.

For ease of understanding, it is assumed that a code segment of the differential file in this embodiment of this application includes one line of code, that is, a line number of the code line is an identifier of the code segment. In this case, it is assumed that a first address space in this embodiment of this application is a line number of the software code of the target software of the old version, and a second address space is a line number of software code of the target software of the new version.

Figure 4:
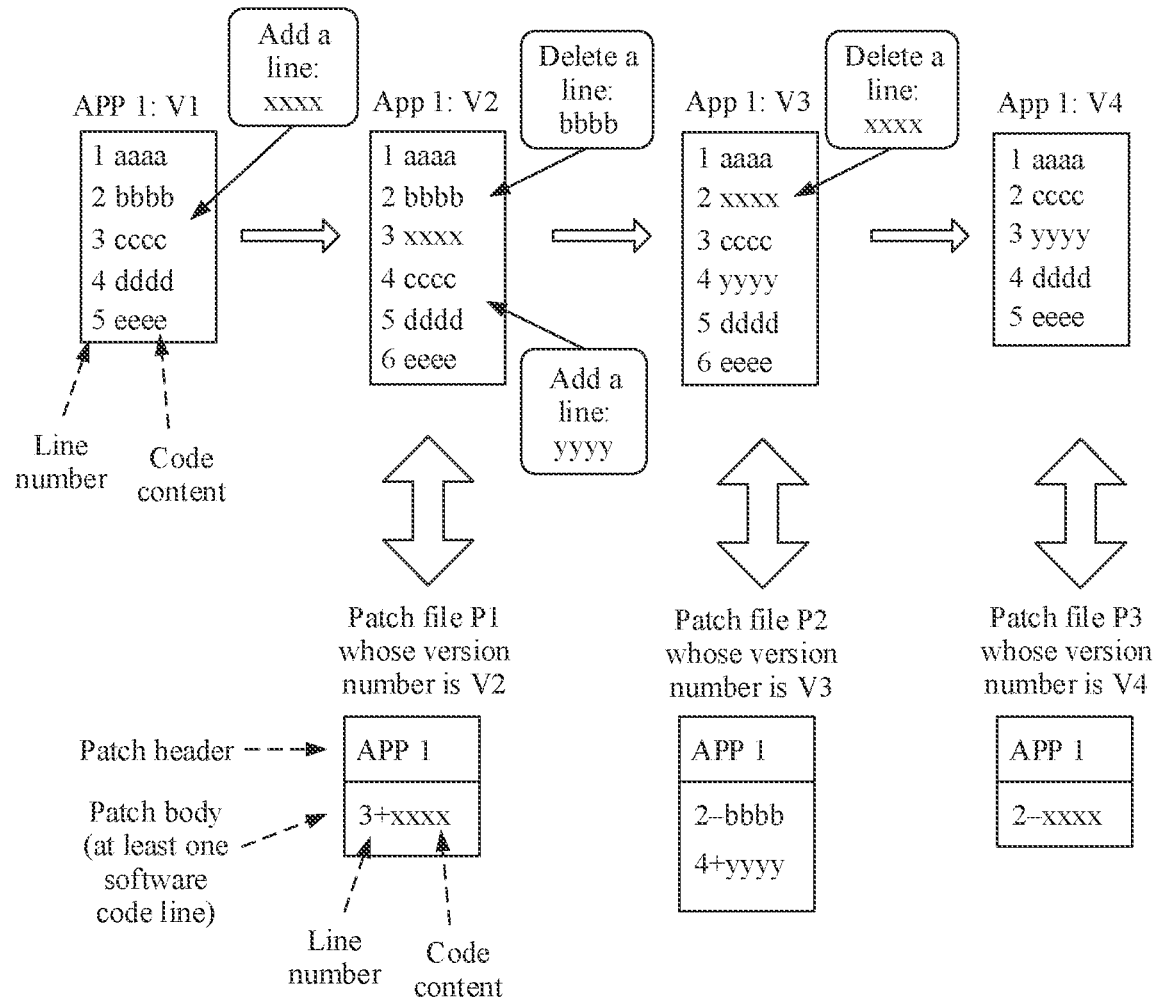
FIG. 4 is a schematic diagram of differential document generation according to an embodiment of this application.

FIG. 4 is used as an example to describe a process of generating a differential file. It is assumed that a file name of target software is APP 1.

When a software development device needs to insert (or add, represented by "+" in FIG. 4) a line xxxx between a second line and a third line on the basis of target software (corresponding software code) with a version number V1 to generate target software with a version number V2, the software development device may generate a differential file P1 with the version number V2. In this way, a terminal device installed with the target software with the version number V1 may update the target software to V2 by downloading and installing the differential file P1 (as shown in FIG. 4).

When the software development device needs to delete (represented by "—" in FIG. 4) a second line and insert a line yyyy between a fourth line and a fifth line on the basis of the target software with the version number V2 to generate target software with a version number V3, the software development device may generate a differential file P2 with the version number V3. In this way, a terminal device installed with the target software with the version number V2 may update the target software to V3 by downloading and installing the differential file P2 (as shown in FIG. 4).

When the software development device needs to delete a second line on the basis of the target software with the version number V3 to generate target software with a version number V4, the software development device may generate a differential file P3 with the version number V4. In this way, a terminal device installed with the target software with the version number V3 may update the target software to V4 by downloading and installing the differential file P3 (as shown in FIG. 4).

It should be noted that the foregoing is merely an example, and the address space in this embodiment of this application is not limited to the code segment identifier or the line number of the code line. For example, the address space in this embodiment of this application may also be represented by an addressing space of storage units in a computer. For example, an address space may be a space from a storage unit of the $X^{th}$ byte to a storage unit of the $Y^{th}$ byte, for example, from an address 0x0000 to an address 0x0009, in other words, the address space is a space from a storage unit of a first byte to a storage unit of a ninth byte, where each storage unit stores data of 1 byte.

The foregoing describes the process of generating the differential file. It can be learned that the differential file includes a series of differential operation instructions, and the differential operation instructions may be arranged according to an execution sequence in chronological order. As described above, the differential operation instructions in this embodiment of this application includes the instruction type and the differential data. The "add" and "delete" shown in FIG. 4 are instruction types. The following describes the differential data and the instruction type in detail.

The differential data in this embodiment of this application includes but is not limited to one or more of the following:

first address space information, second address space information, first data, or second data.

The first address space information is used to indicate an address space in target software of an old version, the second address space information is used to indicate an address space in target software of a new version, the first data is data in the target software of the old version, and the second data is data in the target software of the new version. For ease of description, in the following description, the address space that is in the target software of the first version and that is indicated by the first address space information is referred to as an old address space for short, the address space that is in the target software of the new version and that is indicated by the second address space information is referred to as a new address space for short, the first data is referred to as old data for short, and the second data is referred to as new data for short.

For ease of understanding and description, in the following, the first address space included in the first version is referred to as an old address space, the second address space included in the second version is referred to as a new address space, data stored in the first address space (that is, the first data in this application) is referred to as old data, and data stored in the second address space (that is, the second data in this application) is referred to as new data.

The instruction type in this embodiment of this application includes but is not limited to one or more of the following:

ignoring instruction, shift instruction, add instruction, deletion instruction, and replacement instruction.

The following describes the foregoing instruction types in detail.

(1) An ignoring instruction is used to indicate a part of data that is of target software of a new version and that is the same as data of target software of an old version, where the same data is indicated by differential data. It may be understood that, for the ignoring instruction, the new version and the old version have a same address space, which is included in corresponding differential data. It should be understood that because the new version and the old version have the same address space, this part of address space may be referred to as an old address space, or may be referred to as a new address space.

(2) A shift instruction is used to instruct to transfer data in an old address space (that is, old data) to a new address space.

(3) An add instruction is used to instruct to insert a new address space in an old version and to new data stored in the new address space. As shown in FIG. 4, the add instruction is used to instruct to add or insert a new address space, for example, insert a new code line and new data, on the basis of target software (corresponding software code) of an old version. For example, the new data is program code edited in the newly inserted address space.

(4) A deletion instruction is used to instruct to delete an old address space of an old version. It should be understood that deleting the old address space is deleting old data stored in the old address space. As shown in FIG. 4, when the target software with the version number V3 is generated based on the target software with the version number V2, code in the second line is deleted. It should be understood that, after deletion is completed, a third line of the original old version becomes a second line.

(5) A replacement instruction is used to instruct to replace old data stored in an old address space of an old version with new data.

The foregoing describes the differential operation instructions. When updating target software by using a differential file, a terminal device performs a corresponding differential operation based on differential data and an instruction type included in each differential operation instruction, to obtain target software of a new version.

For example, Table 1 shows specific examples of differential operation instructions included in a differential update package provided in this embodiment of this application. A sequence of rows in Table 1 indicates an execution sequence of the differential operation instructions included in the differential update package.

TABLE 1

| Differential operation instruction | Instruction type | Differential data | | | |
|---|---|---|---|---|---|
| | | Old address space (line number) | Old data | New address space (line number) | New data |
| 1 | Ignoring instruction | 1 to 100 | | | |
| 2 | Shift instruction | 101 and 102 | | 201 to 202 | |
| 3 | Add instruction | | | 300 | yyyy |
| 4 | Deletion instruction | 400 | | | |
| 5 | Replacement instruction | 500 | aaaaa | | bbbb |

It should be noted that Table 1 is merely an example. In this embodiment of this application, instruction types included in the differential operation instructions in the differential update package are not limited. For example, only one of an ignoring instruction, a shift instruction, an add instruction, a deletion instruction, and a replacement instruction is included; or some of the foregoing instructions are included, for example, an ignoring instruction and a shift instruction are included, or a deletion instruction and a replacement instruction are included; or all of the foregoing instructions are included, for example, an ignoring instruction, a shift instruction, an add instruction, a deletion instruction, and a replacement instruction are included.

It can be learn from the first row of Table 1 that, in the differential data corresponding to the ignoring instruction in the differential operation instruction 1, the old address space is the code lines 1 to 100, which means that compared with the $1^{st}$ to $100^{th}$ code lines of the target software of the old version, the $1^{st}$ to $100^{th}$ code lines of the target software of the new version do not change, in other words, the $1^{st}$ to $100^{th}$ code lines of software code of the target software of the new version are the same as the $1^{st}$ to $100^{th}$ code lines of the software code of the target software of the old version.

It can be learned from the second row in Table 1 that, in the differential data corresponding to the shift instruction in the differential operation instruction 2, the old address space is the code lines 101 and 102, and the new address space is the code lines 201 and 202. In this case, a differential operation that is performed by the terminal device and that corresponds to the differential operation instruction is transferring the $101^{st}$ and $102^{nd}$ code lines (program code of the $101^{st}$ and $102^{nd}$ code lines) of the software code of the target software of the old version to the $201^{st}$ and $220^{th}$ code lines.

It can be learned from the third row in Table 1 that, in the differential data corresponding to the add instruction in the differential operation instruction 3, the new address space is the code line 300. In this case, a differential operation that is performed by the terminal device and that corresponds to the differential operation instruction is inserting a new code line whose data is yyyy into the code line 300 of the software code of the target software. It may be understood that after the new code line is inserted, the $300^{th}$ line in the old version becomes the $301^{th}$ line in the new version.

It can be learned from the fourth row in Table 1 that, in the differential data corresponding to the deletion instruction in the differential operation instruction 4, the old address space is the code line 400. In this case, a differential operation that is performed by the terminal device and that corresponds to the differential operation instruction is deleting the $400^{th}$ code line in the old address space, where specific data for deletion is data stored in the $400^{th}$ code line, which is cccc.

It can be learned from the fifth row in Table 1 that, in the differential data corresponding to the replacement instruction in the differential operation instruction 5, the old address space is the code line 500. In this case, a differential operation that is performed by the terminal device and that corresponds to the differential operation instruction is replacing program code aaaaa of the $500^{th}$ code line in the old address space with bbbb.

The terminal device sequentially performs the differential operations corresponding to the differential operation instructions 1 to 5 shown in Table 1, to obtain the target software of the new version, that is, update the target software from the current old version to the new version. In conclusion, a process in which the terminal device updates the target software by using the differential update package shown in Table 1 is as follows.

Step 1. Transfer the $101^{st}$ and $102^{nd}$ code lines (program code) to the $201^{st}$ and $202^{nd}$ code lines.

Step 2. Insert the new code line into the $300^{th}$ code line, where data of the code line is yyyy.

Step 3. Delete the $400^{th}$ code line. It should be understood that deleting the $400^{th}$ code line is deleting the data cccc of the $400^{th}$ code line.

Step 4. Replace the data bbbb in the $500^{th}$ code line of the target software of the current version with the data aaaaa.

Performing the ignoring instruction may be understood as not modifying the target software, and therefore is not described in the foregoing steps.

Figure 5:
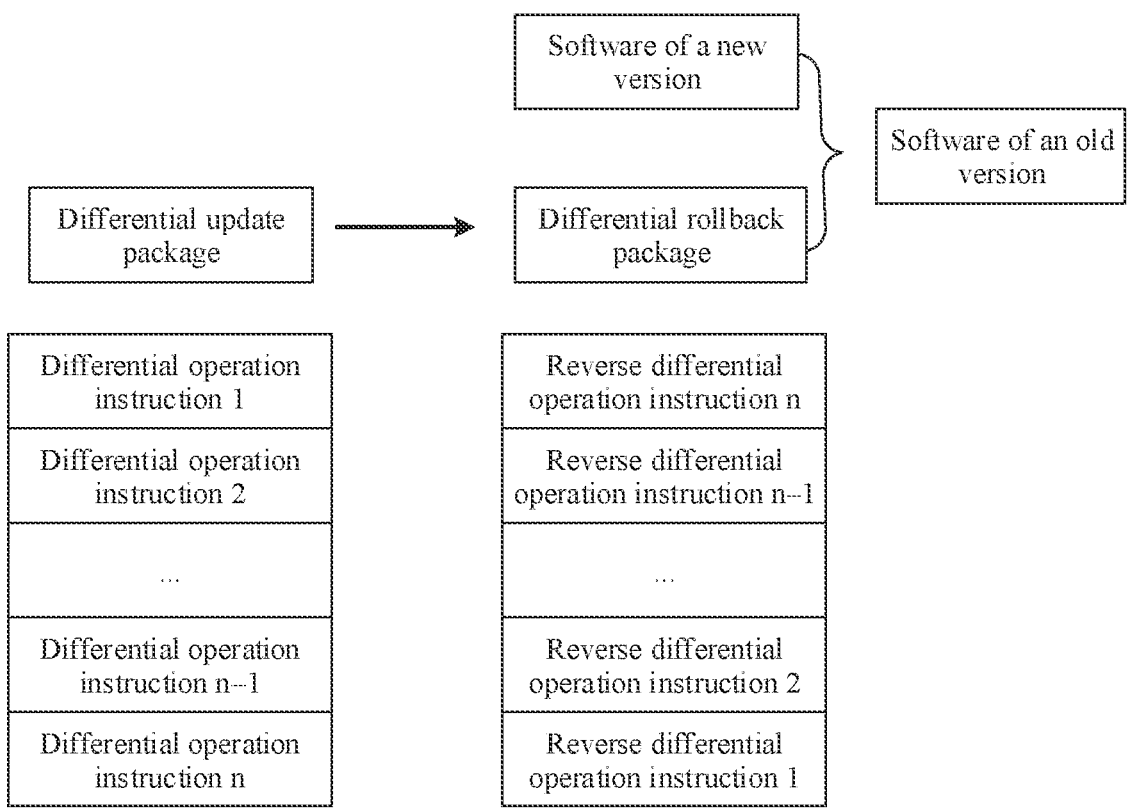
FIG. 5 is a schematic diagram of a scenario of differential rollback package generation according to an embodiment of this application.

The foregoing describes the differential update package and the process in which the terminal device updates the target software by using the differential update package. FIG. 5 is a schematic diagram of a scenario in which a differential rollback package is generated based on the differential update package according to an embodiment of this application. With reference to the scenario shown in FIG. 5, the following describes a process in which a terminal device generates a differential rollback package based on a differential update package.

First, content of the differential update package is parsed to obtain the differential operation instructions that are arranged according to the execution sequence in chronological order shown in Table 1. Then the differential operation instructions are rearranged in reverse chronological order, and each differential operation instruction is replaced with a reverse differential operation instruction corresponding to the differential operation instruction, to generate the differential rollback package. The differential rollback package is used to roll back target software of a new version, so that the target software can be rolled back to an old version of the target software.

The reverse differential operation instruction corresponding to the differential operation instruction indicates performing a second differential operation corresponding to the reverse differential operation instruction after a first differential operation corresponding to the differential operation instruction is performed, so that rollback to a state that the target software (corresponding software code) is in before the first differential operation is performed can be achieved.

For example, it is assumed that a differential operation instruction is to transfer data in a first address space to a second address space, a reverse instruction corresponding to the differential operation instruction is to transfer data in the second address space to the first address space.

It should be noted that, because the ignoring instruction does not affect rollback, and a reverse differential operation instruction corresponding to the ignoring instruction is also an ignoring instruction, execution of the ignoring instruction is scheduled randomly in the differential update package and/or the differential rollback package, or the differential operation instruction may not be included in the differential update package and the differential rollback package. This is not limited in this embodiment of this application.

Table 2 shows a specific example of the differential rollback package corresponding to the differential update package shown in Table 1. The differential rollback package includes five differential operation instructions. Each row in Table 2 indicates a differential operation instruction. Similar to the differential operation instruction in the differential update package, each differential operation instruction may include an instruction type and differential data. It should be noted that a sequence of rows in Table 2 indicates an execution sequence of the differential operation instructions included in the differential rollback package.

TABLE 2

| Reverse differential operation instruction | Instruction type | Differential data | | | |
|---|---|---|---|---|---|
| | | Old address space (line number) | Old data | New address space (line number) | New data |
| 1 | Replacement instruction | 500 | aaaaa | | bbbb |
| 2 | Add instruction | 400 | | cccc | |
| 3 | Deletion instruction | 300 | yyyy | | |
| 4 | Shift (Rollback) instruction | 201 and 202 | | 101 and 102 | |
| 5 | Ignoring instruction | 1 and 100 | | | |

In this embodiment of this application, a process in which the terminal device rolls back the target software by using the differential rollback package shown in Table 2 is as follows.

Step 1. Replace the data (program code) aaaaa in the $500^{th}$ code line of the target software of a current version with the data bbbb.

Step 2. Insert a new code line into the $400^{th}$ code line, where data of the code line is xxxx.

Step 3. Delete the $300^{th}$ code line. It should be understood that deleting the $300^{th}$ code line is deleting the data yyyy of the $300^{th}$ code line.

Step 4. Transfer the $201^{st}$ and $202^{nd}$ code lines to the $101^{st}$ and $102^{nd}$ code lines.

As described above, performing the ignoring instruction may be understood as not modifying the target software, and therefore is not described in the foregoing steps.

As described above, after rolling back the target software by using the differential rollback package, the terminal device may roll back the target software from the new version to the old version.

It should be noted that, in a system in this embodiment of this application, there are a plurality of devices that can generate the differential rollback package, and there are also a plurality of manners of generating the differential rollback package. Examples are used in the following description.

Generation manner 1: Generated by a software development device.

The software development device generates the differential rollback package based on the differential update package in the foregoing manner, and sends the differential rollback package to an update server, so that the update server stores the differential rollback package.

For example, the terminal device may also download the differential rollback package when downloading the differential update package. After the target software is updated by using the differential update package, if there is a rollback requirement, the downloaded differential rollback package is directly used to roll back the target software. In this manner, the rollback requirement of the target software can be promptly and quickly responded to, and time spent on rolling back the target software to the old version can be shortened.

In another example, the terminal device may download the differential rollback package of the target software from the update server when detecting that there is a rollback requirement for the target software. In this manner, the differential rollback package can be prevented from occupying storage space of the terminal device for a long time.

Specifically, there are different types of rollback requirements for the target software in different scenarios. Two types are listed in the following description.

Type 1: The terminal device has a rollback requirement for the target software.

For example, after the target software is updated, if the terminal device detects that there is a rollback requirement for the target software, for example, in cases where the target software runs abnormally, the target software cannot be started, the target software crashes, or there is a bug in the target software, for example, the target software cannot respond to a user operation, the terminal device may trigger rollback of the target software. For example, the target software generates a rollback instruction, where the rollback instruction instructs to perform a rollback operation on the target software, and for example, the rollback instruction carries an identifier of the target software such as an application name, and a version number of a version to which the target software is to be rolled back. The version number may be the same as that of the differential rollback package of the target software, or may be determined based on a preset correspondence.

Type 2: A user has a rollback requirement for the target software.

After the update of the target software is completed, if the user wants the target software to roll back to a previous version (the old version) in a case, for example, where different versions of some software have different functions, and updated target software of a new version does not have a function frequently used by the user, the user may trigger the terminal device to perform rollback. For example, the user controls the terminal device to install a complete installation file of the target software of the old version, or the terminal device has a rollback functional button, where the rollback functional button may be used for selecting software to be rolled back. The user may perform an operation on the functional button, to trigger the terminal device to roll back the target software.

The foregoing rollback requirement is merely an example, and this is not limited in this embodiment of this application.

Generation manner 2: Generated by a terminal device.

The terminal device downloads the differential update package from the update server, and generates the differential rollback package based on the differential update package. A possible implementation is that, before updating the target software by using the differential update package, the terminal device generates the differential rollback package based on the differential update package, and stores the differential rollback package. After update of the target software based on the differential update package is completed, if a rollback requirement for the target software is detected, the terminal device may roll back the target software by using the differential rollback package.

Another possible implementation is as follows. The terminal device backs up the differential update package. After updating the target software by using the differential update package, if a rollback requirement for the target software is detected, the terminal device generates the differential rollback package by using the backup differential update package, and rolls back the target software by using the generated differential rollback package. Optionally, the terminal device may not back up the differential update package, and may download the differential update package from the update server when detecting that there is a rollback requirement for the target software.

It should be noted that a plurality of forms of the differential update package are applicable to this embodiment of this application. For differential update packages in different forms, specific manners of generating the differential rollback package by using the differential update package may also be different. Examples are used in the following description.

Form 1: The differential data includes an old address space, old data, a new address space, and new data.

Refer to Table 1 described above. The differential data of the differential update package includes the address space of the old version, the old data, the address space of the new version, and the new data.

Because the data included in the differential update package is complete, for the differential update package in this form, the terminal device may directly generate the differential rollback package based on the differential update package. For a specific generation manner, refer to the foregoing related description. Details are not described herein again.

Form 2: The differential data does not include the old data.

Table 1 is used as an example. The data included in the differential update package shown in Table 1 is complete. In an example, a differential of the differential update package is that the differential update package may alternatively not include the old data. Table 3 shows a form in which the differential update package shown in Table 1 does not include the old data.

TABLE 3

| Differential instruction | Differential data | | | |
|---|---|---|---|---|
| | Old address space | Old data | New address space | New data |
| Ignoring instruction | 1 and 100 | | | |
| Shift instruction | 101 and 102 | | 201 and 202 | |
| Add instruction | | | 300 | yyyy |
| Deletion instruction | 400 | | | |
| Replacement instruction | 500 | | | bbbb |

Table 3 is merely an example. When the differential update package does not include the old data, the column of old data may be deleted from Table 3.

It can be learned that the differential update package shown in Table 3 does not affect a differential operation of updating the target software. However, because the data included in the differential update package in this form is incomplete, the terminal device cannot directly generate the differential rollback package based on the differential update package. Therefore, to improve the differential update package, the terminal device may obtain differential data that is stored in the old address spaces and that is indicated by the differential data corresponding to the differential instructions except the ignoring instruction, to supplement the differential update package or Table 3 and generate the differential rollback package based on a supplemented differential update package or Table 3.

An example in which the terminal device is an ECU and the update server is an OTA cloud server is used below to describe the technical solutions of this application in specific embodiments.

Figure 6:
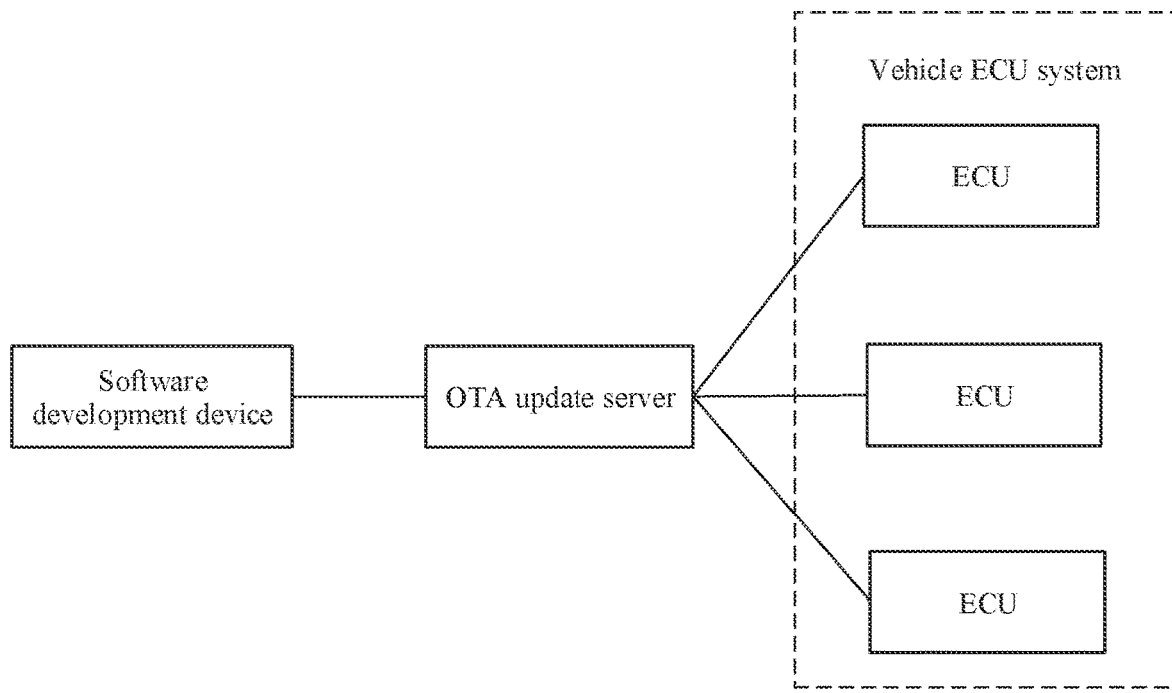
FIG. 6 and FIG. 7 are schematic diagrams of vehicle system architectures according to this application.

FIG. 6 is a schematic diagram of a system architecture used by a vehicle to perform software update and software version rollback according to an embodiment of this application. The system includes a software development device, an OTA cloud server, and an ECU.

A process of implementing software version rollback by an ECU is described below with reference to a scenario shown in FIG. 6 and Embodiments 1 to 3.

Embodiment 1

A procedure in Embodiment 1 may include the following steps.

Step 1. The software development device generates a differential update package of target software.

For example, a process of generating the differential update package by the software development device includes: comparing a new version of the target software with an old version of the target software, and generating the differential update package in a manner described in an embodiment of this application. In addition to a new address space, an old address space, and new data, differential data in the differential update package may further include old data. For example, if the differential update package includes a differential operation instruction whose instruction type is deletion, in addition to the to-be-deleted old address space, the differential operation instruction may further include data stored in the old address space, that is, the old data.

For another example, a process of generating the differential update package by the software development device includes: comparing the new version of the target software with the old version of the target software, and generating the differential update package by using the existing mechanism. It should be noted that, the differential update package generated by using the existing mechanism does not include the old data, that is, a form of the differential update package is Form 2. Therefore, the software development device may further add the old data to the differential update package to obtain a differential update package in Form 1, so that the terminal device can directly generate a differential rollback package based on the differential update package.

Step 2. The software development device sends the differential update package to the OTA server.

Optionally, the software development device may be integrated into the OTA server. If the software development device is integrated into the OTA server, Step 2 is an optional step rather than a mandatory step.

Step 3. The ECU downloads the differential update package of the target software from the OTA server.

Step 4. The ECU generates the differential rollback package based on the differential update package.

Step 5. The ECU updates the target software by using the differential update package, to obtain software of the new version.

Step 6. After detecting that there is a rollback requirement for the target software, the ECU rolls back the target software by using the differential rollback package, to obtain software of the old version.

Step 7. The ECU installs the software of the old version, to replace the software of the new version.

It should be noted that the foregoing Step 4 is merely an example, and the differential rollback package may also be generated by the ECU after the ECU detects that there is a rollback requirement for the target software. The following describes a procedure of this manner in Embodiment 2.

Embodiment 2

A procedure in Embodiment 2 may include the following steps.

Step 1. The software development device generates a differential update package of target software.

Step 2. The software development device sends the differential update package to the OTA server.

Step 3. The ECU downloads the differential update package of the target software from the OTA server.

Step 4. The ECU determines whether the differential update package includes old data (that is, whether a form of the differential update package is Form 1 described above); and if the differential update package includes the old data, the ECU backs up the differential update package; if the differential update package does not include the old data, the ECU obtains, based on a current version of the target software, old data corresponding to differential operation instructions included in the differential update package, adds the old data to the differential update package, and backs up the differential update package to which the old data is added. For a specific manner of adding the old data, refer to the foregoing related description. Details are not described herein again.

Step 5. The ECU updates the target software by using the differential update package, to obtain software of a new version.

Step 6. After detecting that there is a rollback requirement for the target software, the ECU generates a differential rollback package based on the backup differential update package, and rolls back the target software by using the differential rollback package, to obtain software of an old version.

Step 7. The ECU installs the software of the old version, to replace the software of the new version.

In the foregoing Embodiment 1 and Embodiment 2, the ECU generates the differential rollback package. In this application, the differential rollback package may also be generated by a software development device. Embodiment 3 describes a procedure in which the ECU performs software version rollback of the target software in a case where the software development device generates the differential rollback package.

Embodiment 3

A procedure in Embodiment 3 may include the following steps.

Step 1. The software development device generates a differential update package and a differential rollback package of target software.

Step 2. The software development device sends the differential update package and the differential rollback package to the OTA server.

Step 3. The ECU downloads the differential update package and the differential rollback package of the target software from the OTA server.

Step 4. The ECU updates the target software by using the differential update package, to obtain software of a new version.

Step 5. After detecting that there is a rollback requirement for the target software, the ECU rolls back the target software by using the differential rollback package, to obtain software of an old version.

The ECU in Embodiment 1 to Embodiment 3 may be an ECU installed with the target software, or may be another ECU. For example, when the ECU installed with the target software can communicate and interact with the OTA update server, the ECU may directly download the differential update package and the differential rollback package of the target software from the OTA server; or the differential update package and the differential rollback package of the target software may be downloaded by another ECU that can communicate and interact with the OTA update server, and then the differential update package and the differential rollback package is sent to the ECU installed with the target software. This is not limited in this embodiment of this application.

Figure 7:
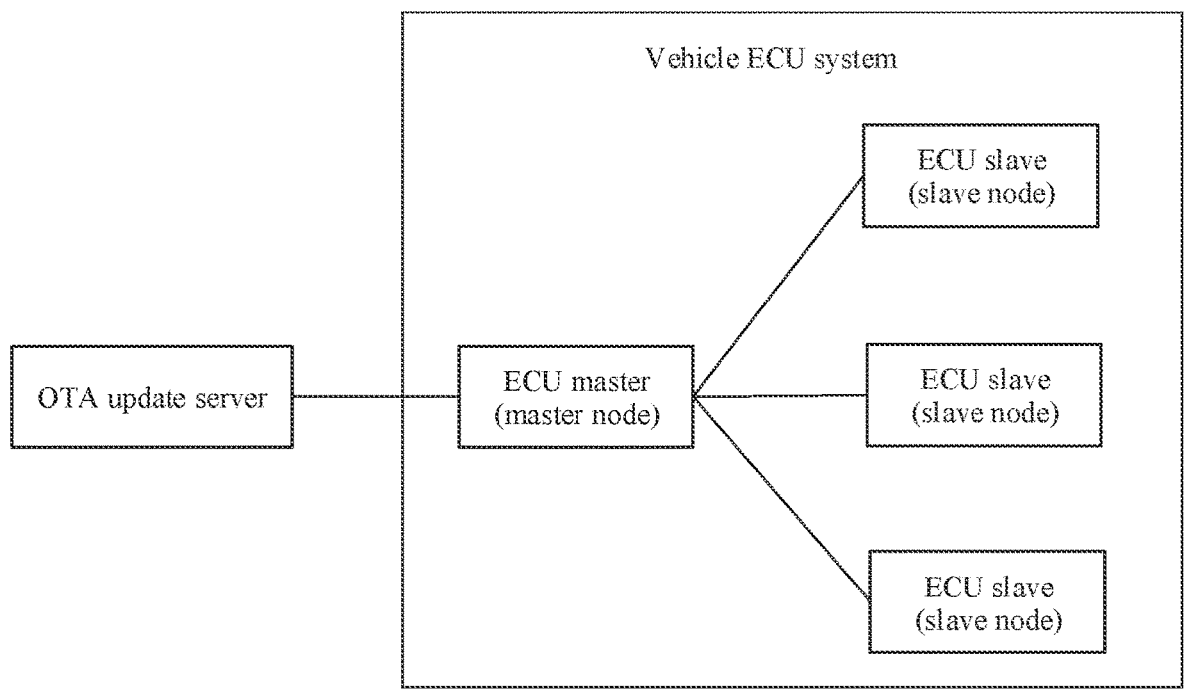

Refer to FIG. 7. FIG. 7 is a schematic diagram of another system architecture used by a vehicle to perform software update and software version rollback according to an embodiment of this application. The system includes a software development device, an OTA cloud server, an ECU master, and an ECU slave (slave node).

The ECU master is an ECU used as a master node and a node configured to monitor and centrally control update of the ECU slave. The ECU master is mainly used for centrally controlling vehicle update. During vehicle update, the ECU master downloads, from the OTA, a vehicle software update package required for vehicle update. The vehicle software update package includes differential update packages corresponding to the ECU master and each ECU slave. The ECU master may split the vehicle software update package, and send each differential update package obtained through splitting to a corresponding ECU slave.

The ECU slave is a slave node of the ECU master, and may have an ability to communicate and interact with the OTA cloud server. For example, when specific software on the ECU slave needs to be updated, if the ECU slave has the ability to communicate and interact with the OTA cloud server, the ECU slave may download a differential update package of the software from the OTA server and update the software. Alternatively, the ECU master may control and manage software update of the ECU slave. For example, after detecting that the OTA cloud server releases a software update package of a new version of the software that is installed on a specific ECU slave, the ECU master downloads the software update package of the new version of the software from the OTA cloud server, and sends the software update package to the ECU slave.

In this embodiment of this application, both the ECU master and the ECU slave may generate differential rollback packages based on the differential update packages, and both the ECU master and the ECU slave can communicate with the OTA to download files. Alternatively, the ECU master is responsible for updating software on the ECU slave, and the ECU master downloads, from the OTA, a differential update package and/or a differential rollback package of a target software installed on the ECU slave, and sends the differential update package and/or the differential rollback package to the ECU slave.

A process of implementing software version rollback by an ECU is described below with reference to a scenario shown in FIG. 7 and Embodiments 4 to 6.

Embodiment 4

A procedure in Embodiment 4 may include the following steps.

Step 1. The software development device generates a differential update package of target software.

Step 2. The software development device sends the differential update package to the OTA server.

Step 3. The ECU master downloads a vehicle software update package from the OTA server.

Step 4. The ECU master splits the vehicle software update package, generates differential rollback packages based on differential update packages obtained through splitting, and sends a differential update package and a differential rollback package of same software to a corresponding ECU slave.

Step 5. ECU slaves update respective target software by using respective differential update packages, to obtain software of a new version, and replace software of an old version.

Step 6. After detecting that there is a rollback requirement for the target software, the ECU slave rolls back the target software by using the differential rollback package, to obtain the software of the old version.

Embodiment 5

A procedure in Embodiment 5 may include the following steps.

Step 1. The software development device generates a differential update package of target software.

Step 2. The software development device sends the differential update package to the OTA server.

Step 3. The ECU master downloads a vehicle software update package from the OTA server.

Step 4. The ECU master splits the vehicle software update package, and sends each differential update package obtained through splitting to a corresponding ECU slave.

Step 5. The ECU slave receives the differential update package from the ECU master, and generates a differential rollback package by using the differential update package.

Step 6. ECU slaves update respective target software by using respective differential update packages, to obtain software of a new version, and replace software of an old version.

Step 7. After detecting that there is a rollback requirement for the target software, the ECU slave rolls back the target software by using the differential rollback package, to obtain the software of the old version.

Embodiment 6

A procedure in Embodiment 6 may include the following steps.

Step 1. The software development device generates a differential update package of target software.

Step 2. The software development device sends the differential update package to the OTA server.

Step 3. The ECU master downloads a vehicle software update package from the OTA server.

Step 4. The ECU master splits the vehicle software update package, and sends each differential update package obtained through splitting to a corresponding ECU slave.

Step 5. The ECU slave receives the differential update package from the ECU master, and determines whether the differential update package includes old data; and if the differential update package includes the old data, the ECU slave backs up the differential update package; if the differential update package does not include the old data, the ECU slave adds the old data to the backup differential update package after backing up the differential update package.

It should be noted that Step 5 is merely an example. The ECU slave may back up the differential update package before determining whether the differential update package includes the old data. In other words, the ECU slave may respectively perform a determining operation and a backup operation in two processes, to reduce a backup delay. The determining operation and the backup operation are not limited in this embodiment of this application.

Step 6. ECU slaves update respective target software by using respective differential update packages, to obtain software of a new version, and replace software of an old version.

Step 7. After detecting that there is a rollback requirement for the target software, the ECU slave generates a differential rollback package based on the backup differential update package, and rolls back the target software by using the differential rollback package, to obtain the software of the old version.

It should be noted that Embodiment 4 is merely an example, and the methods shown in the foregoing Embodiment 1 to Embodiment 3 may also be applied for vehicle update. For example, in Step 1, the software development device may generate a vehicle software rollback package. For example, the software development device generates a differential rollback package based on a differential update package of each piece of software for vehicle update, packs differential rollback packages of all pieces of software into the vehicle software rollback package, and stores the vehicle software rollback package in the OTA server. The ECU master may also back up the differential update package of each piece of software or the vehicle software update package. After detecting that there is a software version rollback requirement for the ECU slave, the ECU master generates the differential rollback package by using the backup differential update package of the software, and sends the differential rollback package to the ECU slave. For details, refer to the foregoing related description. Details are not described herein again.

In the software version rollback manners described in the foregoing embodiments, a complete installation file of the software of the old version does not need to be backed up in a vehicle, and only the differential update package needs to be stored, where a size of the differential update package is much less than a size of the complete installation file of the software of the old version. In this way, storage space is saved. When a rollback requirement for the target software is detected, the complete installation file of the software of the old version does not need to be re-downloaded from the OTA cloud server side, and the differential rollback package may be generated based on the differential update package according to the methods provided in embodiments of this application, so that rollback can be performed in time and time spent on rollback is shortened. In addition, the manner of generating the differential rollback package is simple and efficient, and computing overheads are low.

Figure 8:
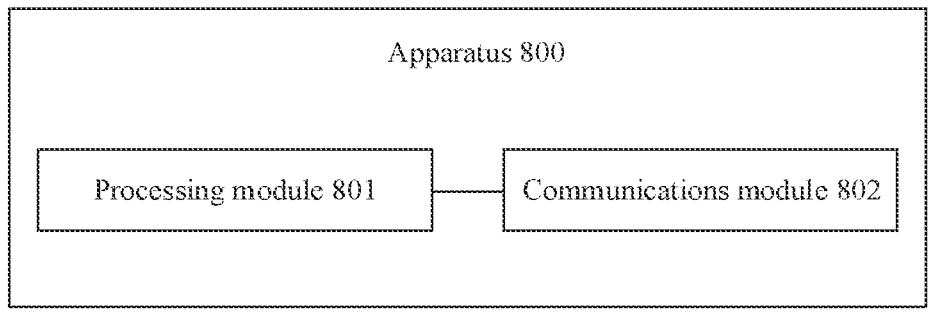
FIG. 8 to FIG. 10 are schematic diagrams of software version rollback apparatuses according to embodiments of this application.

Same as the foregoing concept, as shown in FIG. 8, an embodiment of this application further provides an apparatus 800, configured to implement a function of the terminal device in the foregoing methods. For example, the apparatus may be a software module or a chip system. In this embodiment of this application, the chip system may include a chip, or may include a chip and another discrete component. The apparatus 800 may include a processing module 801 and a communications module 802.

In this embodiment of this application, module division is an example, and is merely logical function division. There may be another division manner in actual implementation. In addition, functional modules in embodiments of this application may be integrated into one processor, or may exist alone physically, or two or more modules are integrated into one module. The integrated module may be implemented in a form of hardware, or may be implemented in a form of a software functional module.

For example, when the apparatus 800 implements a function of the terminal device in the procedure shown in FIG. 2, the communications module 802 is configured to obtain a differential update package of target software, where the differential update package includes at least one differential operation instruction, and the differential operation instruction is used to indicate a difference between a first version of the target software and a second version to which the target software is to be updated.

The processing module 801 is configured to update a current version of the target software by using the differential update package, where the current version of the target software is updated from a first version to a second version; and when a rollback requirement for the target software is detected, perform rollback on the target software by using the differential update package, to roll back the current version of the target software to the first version.

In a possible design, the differential update package includes at least one differential operation instruction, the differential operation instruction includes an instruction type and differential data, and the differential data includes a first address space and/or first data stored in the first address space in the first version, and second data and/or a second address space in the second version.

In a possible design, the processing module 801 is further configured to generate a differential rollback package based on the differential update package.

The differential rollback package is obtained by rearranging, according to a preset sequence, the at least one differential operation instruction arranged in the differential update package; and replacing each rearranged differential operation instruction with a reverse differential operation instruction corresponding to the differential operation instruction. The reverse differential operation instruction corresponding to the differential operation instruction indicates performing a second differential operation according to the reverse differential operation instruction after a first differential operation is performed according to the differential operation instruction, to roll back a version of the target software to a state existing before the first differential operation is performed.

The processing module 801 is specifically configured to roll back the target software by using the differential rollback package.

In a possible design, the instruction type includes but is not limited to one or more of the following types: ignoring, shift, insertion, deletion, or replacement.

In a possible design, when the instruction type of the differential operation instruction is shift, the differential operation instruction is used to instruct to shift the first data from the first address space to the second address space. The second address space is an address space other than the first address space in a first system. The reverse differential operation instruction corresponding to the differential operation instruction is to shift the first data in the second address space back to the first address space.

In a possible design, when the instruction type of the differential operation instruction is insertion, the differential operation instruction is used to instruct to add the second address space in a first system, and add the second data included in the differential operation instruction to the second address space. The reverse differential operation instruction corresponding to the differential operation instruction is to delete the second address space.

In a possible design, when the instruction type of the differential operation instruction is deletion, the differential operation instruction is used to instruct to delete the first address space and the first data stored in the first address space. The reverse differential operation instruction corresponding to the differential operation instruction is to add the first address space and add the first data to the first address space.

In a possible design, when the instruction type of the differential operation instruction is replacement, the differential operation instruction is used to instruct to replace the first data in the first address space with the second data. The reverse differential operation instruction corresponding to the differential operation instruction is to replace the second data in the first address space with the first data.

In a possible design, the terminal device is an in-vehicle terminal device.

Figure 9:
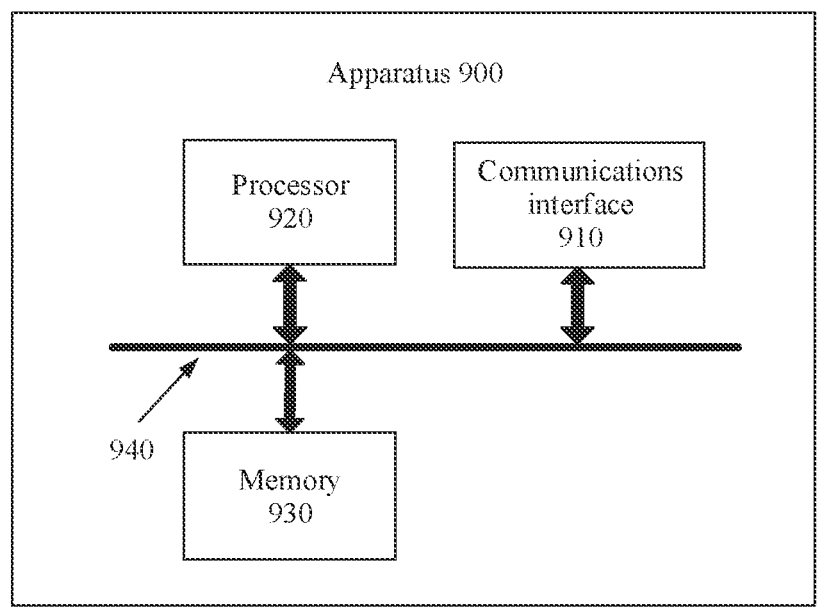

FIG. 9 shows an apparatus 900 according to an embodiment of this application. The apparatus shown in FIG. 9 may be an implementation of a hardware circuit of the apparatus shown in FIG. 9. The communications apparatus is applicable to the flowchart shown in FIG. 2, and the communications apparatus performs functions of the terminal device in the foregoing method embodiments. For ease of description, FIG. 9 shows only main components of the communications apparatus.

The apparatus 900 shown in FIG. 9 includes at least one processor 920, configured to implement a function of the terminal device in the method provided in embodiments of this application.

The apparatus 900 may further include at least one memory 930, configured to store program instructions and/ or data. The memory 930 is coupled to the processor 920. The coupling in this embodiment of this application may be an indirect coupling or a communication connection between apparatuses, units, or modules in an electrical form, a mechanical form, or another form, and is used for information exchange between the apparatuses, the units, or the modules. The processor 920 may operate in collaboration with the memory 930. The processor 920 may execute the program instructions stored in the memory 930. At least one of the at least one memory may be included in the processor.

The apparatus 900 may further include a communications interface 910, configured to communicate with another device through a transmission medium, so that an apparatus in the apparatus 900 can communicate with the another device. In this embodiment of this application, the communications interface may be a transceiver, a circuit, a bus, a module, or a communications interface of another type. In this embodiment of this application, the transceiver may be an independent receiver, an independent transmitter, a transceiver with an integrated receiving and transmitting function, or an interface circuit. The processor 920 receives and transmits data through the communications interface 910, and is configured to implement the method performed by the terminal device in the embodiment corresponding to FIG. 2.

For example, when the apparatus 900 implements a function of the terminal device in the procedure shown in FIG. 2, the communications interface 910 is configured to obtain a differential update package of target software, where the differential update package includes at least one differential operation instruction, and the differential operation instruction is used to indicate a difference between a first version of the target software and a second version to which the target software is to be updated. In an example, the communications interface 910 may directly exchange data with an update server, for example, download the differential update package and/or a differential rollback package. In another example, the apparatus 900 may obtain data by using another device. For example, the apparatus 900 is an ECU, the ECU includes the communications interface 910, the ECU may obtain data by using a T-BOX, and the T-BOX may exchange data with the update server. For example, the T-BOX downloads the differential update package and/or the differential rollback package from the update server, and the ECU may obtain, through the communications interface 910, the differential update package and/or the differential rollback package downloaded in the T-BOX. This is not limited in this embodiment of this application.

In another example, the processor 920 is configured to update a current version of the target software from a first version to a second version by using the differential update package; and when a rollback requirement for the target software is detected, perform rollback on the target software by using the differential update package, to roll back the current version of the target software to the first version.

For another method performed by the processor 920 and the communications interface 910, refer to description in the method procedure shown in FIG. 2. Details are not described herein again.

Figure 10:
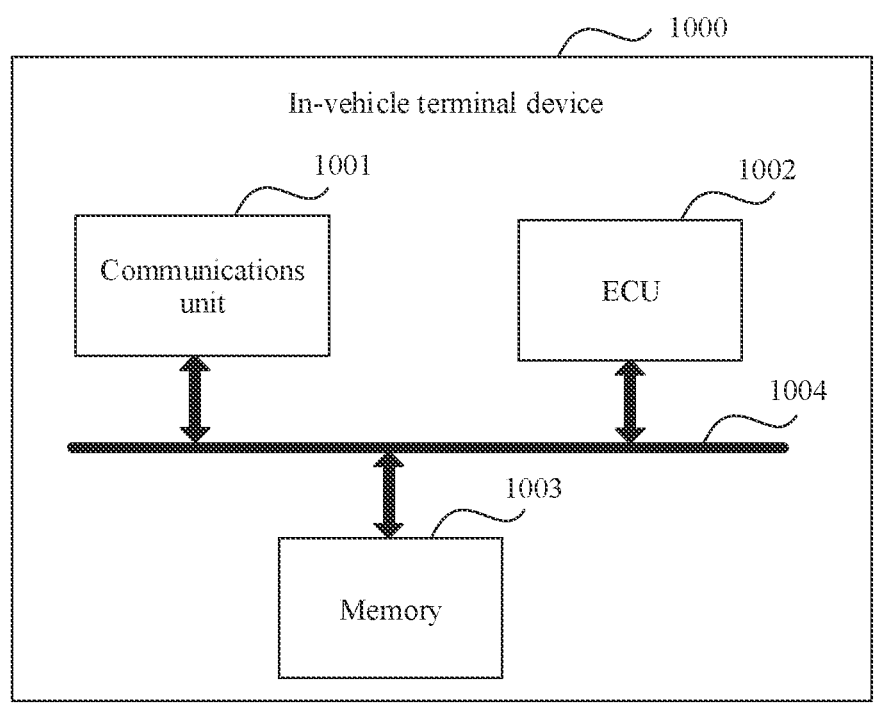

Based on the foregoing embodiments, an embodiment of this application further provides a physical apparatus of a software version rollback apparatus. The apparatus is an in-vehicle terminal device, and the apparatus is configured to implement the software version rollback methods shown in the foregoing figures. Refer to FIG. 10. The apparatus 1000 includes a communications unit 1001, an ECU 1002, and a memory 1003. The communications unit 1001, the ECU 1002, and the memory 1003 are connected.

Optionally, the communications unit 1001, the ECU 1002, and the memory 1003 are connected by a bus 1004. The bus 1004 may be a CAN (controller area network) bus, an Ethernet bus, or the like. The bus may be classified into an address bus, a data bus, a control bus, and the like. For ease of representation, only one thick line is for representing the bus in FIG. 10, but this does not mean that there is only one bus or only one type of bus.

The communications unit 1001 is configured to communicate with another device through a transmission medium. For example, the communications unit 1001 is used by the apparatus ECU 1002 in the apparatus 1000 to communicate with another device. For example, the communications unit 1001 may be a T-BOX (telematics BOX, telematics Box).

The memory 1003 is configured to store program instructions and the like. Specifically, the program instructions may include program code, and the program code includes computer operation instructions. The data may include a differential update package and/or a differential rollback package of target software. The memory 1003 may include a random access memory (random access memory, RAM), or may further include a non-volatile memory (non-volatile memory), for example, at least one magnetic disk memory.

The ECU 1002 may be used in a specific component or system in the in-vehicle terminal device. In different components or systems, the ECU may have different names. For example, a VCU in a motor, a TCU in a gearbox, an EMS in an engine, and a body control module BCM may all be implemented by the ECU. Optionally, different components or systems in the in-vehicle terminal device may be integrated into a same ECU. The ECU 1002 executes the program instructions and the data stored in the memory 1003, to implement the foregoing functions, so as to implement the software version rollback methods provided in the foregoing embodiments. For other methods performed by the communications unit 1001, the ECU 1002, and the memory 1003, refer to the description in the method procedure shown in FIG. 2. Details are not described herein again.

It should be noted that, in embodiments of this application, the processor may be a general-purpose processor, a digital signal processor, an application-specific integrated circuit, a field programmable gate array or another programmable logic device, a discrete gate or transistor logic device, or a discrete hardware component, and may implement or execute the methods, steps, and logical block diagrams disclosed in embodiments of this application. The general purpose processor may be a microprocessor or any conventional processor or the like. The steps in the methods disclosed with reference to embodiments of this application may be directly performed by a hardware processor, or may be performed by a combination of hardware in the processor and a software module.

In embodiments of this application, the term "and/or" describes an association relationship between associated objects and may indicate three relationships. For example, A and/or B may indicate the following cases: Only A exists, both A and B exist, and only B exists, where A and B may be singular or plural. The character "I" usually indicates an "or" relationship between associated objects. "At least one of the following items (pieces)" or a similar expression thereof refers to any combination of these items, including any combination of singular items (pieces) or plural items (pieces). For example, at least one of a, b, or c may indicate: a, b, c, a and b, a and c, b and c, or a, b, and c, where a, b, and c may be singular or plural. "A plurality of" means two or more.

The term "for example" in embodiments of this application is used to represent giving an example, an illustration, or a description. Any embodiment or design scheme described as an "example" in this application should not be explained as being more preferred or having more advantages than another embodiment or design scheme. Exactly, the term "example" is used to present a concept in a specific manner.

Optionally, ordinal numbers such as "first" and "second" in embodiments of this application are used to distinguish between a plurality of objects, but are not intended to limit an order, a time sequence, priorities, or importance of the plurality of objects. For example, first information and second information are merely intended to distinguish between different signaling, but do not indicate that the two types of information are different in content, priorities, a sending sequence, importance, or the like.

In embodiments of this application, the memory may be a non-volatile memory, such as a hard disk drive (hard disk drive, HDD) or a solid-state drive (solid-state drive, SSD), or may be a volatile memory (volatile memory), such as a random access memory (random access memory, RAM). The memory is any other medium that can carry or store expected program code in a form of an instruction or a data structure and that can be, accessed by a computer, but is not limited thereto. The memory in embodiments of this application may alternatively be a circuit or any other apparatus that can implement a storage function, and is configured to store the program instructions and/or the data.

All or some of the methods in embodiments of this application may be implemented by using software, hardware, firmware, or any combination thereof. When software is used to implement the embodiments, all or a part of the embodiments may be implemented in a form of a computer program product. The computer program product includes one or more computer instructions. When the computer program instructions are loaded and executed on a computer, the procedures or functions according to embodiments of the present invention are all or partially generated. The computer may be a general-purpose computer, a dedicated computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (digital subscriber line, DSL for short)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (digital video disc, DVD for short)), a semiconductor medium (for example, an SSD), or the like.

In embodiments of this application, on the premise that there is no logical conflict, embodiments may be mutually referenced. For example, methods and/or terms in the method embodiments may be mutually referenced, and functions and/or terms in the apparatus embodiments may be mutually referenced. For example, functions and/or terms between the apparatus embodiments and the method embodiments may be mutually referenced.

A person skilled in the art can make various modifications and variations to this application without departing from the scope of this application. This application is intended to cover these modifications and variations of this application provided that they fall within the scope defined by the following claims and their equivalent technologies.

What is claimed is:

1. A software version rollback method, comprising:
   obtaining, by an electronic control unit (ECU) of a vehicle, a differential update package of target software, wherein the target software is vehicle software for vehicle operations, the differential update package comprises a plurality of differential operation instructions, and a differential operation instruction of the plurality of differential operation instructions is used to indicate a difference between a first version of the target software and a second version to which the target software is to be updated;
   updating, by the ECU of the vehicle, a current version of the target software by using the differential update package, wherein the current version of the target software is updated from the first version to the second version;
   obtaining, by the ECU of the vehicle, a differential rollback package to roll back the target software from the second version to the first version, wherein the differential rollback package comprises a plurality of reverse differential operation instructions respectively corresponding, in reverse order, to the plurality of differential operation instructions comprised in the differential update package; and
   rolling back, by the ECU of the vehicle, when a rollback requirement for the target software is detected, the second version of the target software to the first version by using the differential rollback package.

2. The method according to claim 1, wherein the differential operation instruction comprises an instruction type and differential data, the instruction type indicates a type of a differential operation, and the differential data comprises at least one of a first address space or first data stored in the first address space in the first version, and at least one of second data or a second address space in the second version.

3. The method according to claim 2, wherein the instruction type comprises one or more of the following types: ignoring, shift, insertion, deletion, or replacement.

4. The method according to claim 2, wherein the instruction type comprises replacement, and the differential data comprises the first address space in the first version and the second data in the second version.

5. The method according to claim 2, wherein:
   a reverse differential operation instruction of the plurality of reverse differential operation instructions indicates performing a second differential operation according to the reverse differential operation instruction after a first differential operation is performed according to the differential operation instruction of the plurality of differential operation instructions, to roll back the target software to a state existing before the first differential operation is performed.

6. The method according to claim 5, wherein:
   the instruction type of the differential operation instruction is shift, the differential operation instruction is used to instruct to shift the first data from the first address space to the second address space, wherein the second address space is an address space other than the first address space in a first system; and the reverse differential operation instruction corresponding to the differential operation instruction is to shift the first data in the second address space back to the first address space.

7. The method according to claim 5, wherein:
the instruction type of the differential operation instruction is insertion, the differential operation instruction is used to instruct to add the second address space in a first system, and add the second data comprised in the differential operation instruction to the second address space; and
the reverse differential operation instruction corresponding to the differential operation instruction is to delete the second address space.

8. The method according to claim 5, wherein:
the instruction type of the differential operation instruction is deletion, the differential operation instruction is used to instruct to delete the first address space and the first data stored in the first address space; and
the reverse differential operation instruction corresponding to the differential operation instruction is to add the first address space and add the first data to the first address space.

9. The method according to claim 5, wherein the instruction type of the differential operation instruction is replacement, the differential operation instruction is used to instruct to replace the first data in the first address space with the second data; and
the reverse differential operation instruction corresponding to the differential operation instruction is to replace the second data in the first address space with the first data.

10. A software version rollback apparatus, comprising:
one or more processors; and
a non-transitory computer readable medium storing a program comprising instructions that, when executed by the one or more processors, cause the software version rollback apparatus to perform operations comprising:
obtaining a differential update package of target software, wherein the target software is vehicle software for vehicle operations, the differential update package comprises a plurality of differential operation instructions, and a differential operation instruction of the plurality of differential operation instructions is used to indicate a difference between a first version of the target software and a second version to which the target software is to be updated;
updating a current version of the target software by using the differential update package, wherein the current version of the target software is updated from the first version to the second version;
obtaining a differential rollback package to roll back the target software from the second version to the first version, wherein the differential rollback package comprises a plurality of reverse differential operation instructions respectively corresponding, in reverse order, to the plurality of differential operation instructions comprised in the differential update package; and
rolling back, when a rollback requirement for the target software is detected, the second version of the target software to the first version by using the differential rollback package.

11. The software version rollback apparatus according to claim 10, wherein the differential operation instruction comprises an instruction type and differential data, the instruction type indicates a type of a differential operation, and the differential data comprises at least one of a first address space or first data stored in the first address space in the first version, and at least one of second data or a second address space in the second version.

12. The software version rollback apparatus according to claim 11, wherein the instruction type comprises one or more of the following types: ignoring, shift, insertion, deletion, or replacement.

13. The software version rollback apparatus according to claim 11, wherein the instruction type comprises replacement, and the differential data comprises the first address space in the first version and the second data in the second version.

14. The software version rollback apparatus according to claim 11, wherein:
a reverse differential operation instruction of the plurality of reverse differential operation instructions indicates performing a second differential operation according to the reverse differential operation instruction after a first differential operation is performed according to the differential operation instruction of the plurality of differential operation instructions, to roll back the target software to a state existing before the first differential operation is performed.

15. The software version rollback apparatus according to claim 14, wherein:
the instruction type of the differential operation instruction is shift, the differential operation instruction is used to instruct to shift the first data from the first address space to the second address space, wherein the second address space is an address space other than the first address space in a first system; and
the reverse differential operation instruction corresponding to the differential operation instruction is to shift the first data in the second address space back to the first address space.

16. The software version rollback apparatus according to claim 14, wherein:
the instruction type of the differential operation instruction is insertion, the differential operation instruction is used to instruct to add the second address space in a first system, and add the second data comprised in the differential operation instruction to the second address space; and
the reverse differential operation instruction corresponding to the differential operation instruction is to delete the second address space.

17. The software version rollback apparatus according to claim 14, wherein:
the instruction type of the differential operation instruction is deletion, the differential operation instruction is used to instruct to delete the first address space and the first data stored in the first address space; and
the reverse differential operation instruction corresponding to the differential operation instruction is to add the first address space and add the first data to the first address space.

18. The software version rollback apparatus according to claim 14, wherein the instruction type of the differential operation instruction is replacement, the differential operation instruction is used to instruct to replace the first data in the first address space with the second data; and
the reverse differential operation instruction corresponding to the differential operation instruction is to replace the second data in the first address space with the first data.

19. A non-transitory computer-readable medium storing computer-executable instructions that, when executed by one or more processors, cause a device to:
- obtain a differential update package of target software, wherein the target software is vehicle software for vehicle operations, the differential update package comprises a plurality of differential operation instructions, and a differential operation instruction of the plurality of differential operation instructions is used to indicate a difference between a first version of the target software and a second version to which the target software is to be updated;
- update a current version of the target software by using the differential update package, wherein the current version of the target software is updated from the first version to the second version;
- obtain a differential rollback package to roll back the target software from the second version to the first version, wherein the differential rollback package comprises a plurality of reverse differential operation instructions respectively corresponding, in reverse order, to the plurality of differential operation instructions comprised in the differential update package; and
- roll back, when a rollback requirement for the target software is detected, the second version of the target software to the first version by using the differential rollback package.

20. A software version rollback system, comprising an update server and a software version rollback apparatus, wherein:

the update server is configured to send a differential update package of target software to the software version rollback apparatus, wherein the target software is vehicle software for vehicle operations; and the software version rollback apparatus comprises:
- one or more processors; and
- a non-transitory computer readable medium storing a program comprising instructions that, when executed by the one or more processors, cause the software version rollback apparatus to:
  - obtain the differential update package of the target software from the update server, wherein the target software is vehicle software for vehicle operations;
  - update a current version of the target software by using the differential update package, wherein the current version of the target software is updated from a first version to a second version;
  - obtain a differential rollback package to roll back the target software from the second version to the first version, wherein the differential rollback package comprises a plurality of reverse differential operation instructions respectively corresponding, in reverse order, to a plurality of differential operation instructions comprised in the differential update package; and
  - roll back when a rollback requirement for the target software is detected, the second version of the target software to the first version by using the differential rollback package.

* * * * *